(12) United States Patent
Breuer et al.

(10) Patent No.: US 8,362,708 B2
(45) Date of Patent: Jan. 29, 2013

(54) CIRCUIT ARRANGEMENT FOR OPERATING DISCHARGE LAMPS AND METHOD FOR OPERATING DISCHARGE LAMPS

(75) Inventors: Christian Breuer, Newburyport, MA (US); Martin Brueckel, Shenzhen (CN); Bernhard Reiter, Munich (DE); Andreas Huber, Maisach (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 235 days.

(21) Appl. No.: 12/602,179

(22) PCT Filed: Jun. 14, 2007

(86) PCT No.: PCT/EP2007/055867
§ 371 (c)(1),
(2), (4) Date: Nov. 30, 2009

(87) PCT Pub. No.: WO2008/151669
PCT Pub. Date: Dec. 18, 2008

(65) Prior Publication Data
US 2010/0171434 A1 Jul. 8, 2010

(51) Int. Cl.
*H05B 37/02* (2006.01)
(52) U.S. Cl. .......................... 315/291; 315/224; 315/307
(58) Field of Classification Search ............. 315/209 R, 315/224–226, 246, 291, 302, 307, 362, DIG. 7
See application file for complete search history.

(56) References Cited

U.S. PATENT DOCUMENTS

| | | | |
|---|---|---|---|
| 5,917,558 A | 6/1999 | Stanton | |
| 7,285,920 B2 * | 10/2007 | Riederer et al. | 315/246 |
| 7,327,096 B2 * | 2/2008 | Monch et al. | 315/291 |
| 2003/0098659 A1 | 5/2003 | Okamoto et al. | |
| 2003/0160577 A1 * | 8/2003 | Noguchi et al. | 315/291 |
| 2004/0000880 A1 | 1/2004 | Ozasa et al. | |
| 2005/0151483 A1 | 7/2005 | Nagai et al. | |
| 2009/0236999 A1 * | 9/2009 | Yufuku et al. | 315/287 |

FOREIGN PATENT DOCUMENTS

| | | |
|---|---|---|
| EP | 1624733 A2 | 2/2006 |
| JP | 2004039563 A | 2/2004 |
| WO | 9535645 | 12/1995 |

OTHER PUBLICATIONS

International Search Report of PCT/EP2007/055867 dated Feb. 5, 2008.
English Language Abstract for JP 2004039563 A, Feb. 5, 2004.

* cited by examiner

*Primary Examiner* — Jimmy Vu

(57) ABSTRACT

A circuit arrangement for operating a discharge lamp is provided. The circuit arrangement may include a commutating device, which is configured to exhibit an input which is coupled to a direct-current source and has an output which can be coupled to a discharge lamp; the commutating device being configured in such a manner that it couples the direct-current source to the output and the polarity with which the direct-current source is coupled to the output can be commutated by a control device; the control device including a measurement input which is coupled to a measuring device which is configured to deliver a measurement value which is a measure of the magnitude of a lamp voltage; wherein the control device is configured to control the commutating device in such a manner that the polarity at which a higher lamp voltage prevails is coupled longer to the output.

13 Claims, 3 Drawing Sheets

CIRCUIT ARRANGEMENT FOR OPERATING DISCHARGE LAMPS AND METHOD FOR OPERATING DISCHARGE LAMPS

RELATED APPLICATIONS

The present application is a national stage entry according to 35 U.S.C.§371 of PCT application No.: PCT/EP2007/055867 filed on Jun. 14, 2007.

BACKGROUND

The invention relates to a circuit arrangement for operating discharge lamps with alternating current, especially high and extra-high-pressure discharge lamps as used in devices for projecting images. The invention deals with the problem of flickering phenomena which are caused by an arc perturbation of the discharge lamps after a polarity change of the lamp current. In particular, the invention deals with problems which are associated with detection of changes of the electrodes of the discharge lamps.

There is in the operation of discharge lamps, which will also be called lamp for short in the text which follows, the phenomenon of the growth of electrode spikes. Material which is evaporated from the electrodes at one point is deposited again on the electrode at preferred points and leads to the formation of electrode spikes. These electrode spikes initially have the advantage that the plasma arc of the arc discharge generated in the lamp finds a stable root point of the electrode and does not jump between several root points. This jumping of the discharge point is also called arc jumping and manifests itself in a flickering of the lamp. This is particularly disturbing when the light of the lamp is used for projecting images.

The root point of the arc only forms on an electrode which currently acts as a cathode. The root of the arc on the anode is two dimensional. Arc jumping is therefore a wide-spread problem in lamps which are operated with alternating current since, with each polarity change, the arc must find a root point on the electrode changing from the anode to the cathode. The electrode spikes described above form a preferred root point for the arc and thus reduce arc jumping.

However, problems can also occur due to the electrode spikes. Under unfavorable conditions, several electrode spikes can form. It can then happen that the arc root jumps between the various electrode spikes.

In the document EP 1 624 733 A2 (Suzuki), this problem is solved by reducing the operating frequency, i.e. the frequency of alternating current with which the lamp is operated, for a limited time. This method works due to the fact that an electrode heats whilst it is acting as an anode and cools down whilst it is acting as a cathode. This provides a temperature fluctuation with a variation in time which corresponds to the operating frequency. At high frequencies, a mean temperature occurs due to the thermal capacity of the electrodes. In so-called square-wave operation, the lamps are operated with a square-wave current having a frequency of typically 50 to 5000 Hz. Depending on the design of the lamp, a noticeable temperature modulation of the electrodes can already occur at 50 Hz. With a strong temperature modulation, the electrode reaches temperatures at which the redundant electrode spikes are melted off.

Video projectors frequently need a light source which exhibits a sequence of different colors in time. As is described in the document U.S. Pat. No. 5,917,558 (Stanton), this can be achieved by means of a rotating color wheel which filters alternating colors out of the light of the lamp. The periods during which the light assumes a certain color do not need to be mandatorily identical. Instead, a desired color temperature produced for the projected light can be set via the ratio of these periods with respect to one another.

The lamp is usually operated with a square-wave lamp current. The above-mentioned operating frequency is understood to be the reciprocal of the period of the square-wave lamp current. In the prior art, the lamp current is generated from a direct-current source with the aid of a commutating device. The commutating device usually consists of electronic switches which commutate the polarity of the direct-current source at the rate of the square-wave lamp current. In practice, overshoots cannot be avoided completely during the commutation. For this reason, to mask out the overshoots, the time at which a commutation is to take place is combined with the time at which the color of the light changes, in the prior art. For this purpose, a sync signal is provided which exhibits a sync pulse in synchronism with the abovementioned color wheel. With the aid of the sync signal the color change and the commutation of the lamp current are synchronized.

In general, electrode spikes do not grow in the same manner on both electrodes. The reason for this can be that the installation conditions of the lamp influence the heat balance of the electrodes differently. It is especially when a lamp is not operated horizontally that this, as a rule, leads to a higher temperature of the more highly placed electrode. If spikes grow several times on an electrode, a melting-off of the electrodes is proposed in the abovementioned prior art in order to avoid flickering phenomena. However, melting-off of both electrodes can damage the electrode having only one electrode spike. This one electrode spike is possibly melted off even though it does not cause any flickering phenomena.

SUMMARY

Various embodiments provide a circuit arrangement for operating a discharge lamp in which electrode spikes are melted off only in the electrode which has several electrode spikes.

Various embodiments provide a method corresponding to the above-mentioned object. Since the invention also has a method aspect, the description following is intended to be understood both with regard to the device character and the method character.

The object is achieved by a circuit arrangement for operating a discharge lamp, wherein the circuit arrangement includes a commutating device which exhibits an input which is coupled to a direct-current source and has an output which can be coupled to a discharge lamp, the commutating device being designed in such a manner that it couples the direct-current source to the output and the polarity with which the direct-current source is coupled to the output can be commutated by a control device. The direction of current through the lamp is thus commutated, that is to say its polarity is reversed, controlled by the control device. The control device has a measuring input which is coupled to a measuring device (See FIG. 1) which is designed for delivering a measurement value which is a measure of the magnitude of a lamp voltage. According to the invention, the control device controls the commutating device in such a manner that the polarity of the lamp current at which a higher lamp voltage prevails is coupled longer to the output.

The proposed solution is a result of investigations which show that the lamp voltage is increased at least in the mean when the electrode which has several electrode spikes is currently the anode.

A further possibility for detecting the electrode having several electrode spikes consists in comparing the fluctuations of the lamp voltage during different polarities. For this purpose, the alternating-voltage component of the lamp voltage can be detected during one polarity via a high-pass filter, and compared with the alternating-current component during the other polarity. The electrode which is the cathode with the polarity having the higher alternating-voltage component exhibits several electrode spikes.

The simplest possibility of finding out the polarity at which the higher lamp voltage prevails is provided with the aid of a comparator (COMP, See FIG. 1) which can be associated with the control device. The comparator stores the measurement value in a first and in a second polarity and compares the stored measurement values. The comparator delivers a marking signal which is used by the control device as information on the polarity at which a higher lamp voltage prevails. Naturally, this is the polarity which is allocated to the higher one of the stored measurement values in this case. The marking signal can be designed in such a manner that in a memory cell of a microcontroller, a bit is set which produces an extension of the time in which the polarity of the lamp current at which the higher lamp voltage prevails is present. The expert will know other embodiments of the marking signal and its conversion in accordance with the teachings of the present invention.

Since the lamp voltage is subject to random fluctuations, measuring single values of the lamp voltage harbors uncertainty. The comparator advantageously therefore forms from the measurement values a mean value over a predeterminable first time interval and stores the mean value. Naturally, the averaging must happen in each case only over values which are allocated to one polarity of the lamp current. In the case of a square-wave lamp current, the averaging can extend in each case over a half period of the square wave. To increase the measuring accuracy, the averaging can also take place over several half periods of the same polarity of the lamp current.

In the present patent application, the expression "a higher lamp voltage prevails" can accordingly be interpreted in such a manner that a higher lamp voltage prevails in the mean. The decisive factor is that the control device compares the lamp voltages at different lamp current polarity and the decision about the polarity at which the higher lamp voltage prevails depends on the values of the lamp voltage at different polarity. If the control device is digitally implemented, a so-called histogram evaluation can be advantageously performed. The measurement values coming into the control device for the lamp voltage of one polarity are sorted in accordance with intervals and the interval having most of the associated measurement values is used for the comparison with the other polarity.

The lamp voltage at one polarity of the lamp current is never exactly identical to the lamp voltage of the other polarity. There can also be slight differences of the compared lamp voltages if none of the electrodes have multiple electrode spikes. By means of measurements, it is possible to determine for a desired lamp type the difference of the respective lamp voltages at which several electrode spikes are present with a high probability. Advantageously, the comparator therefore only delivers a marking signal when the difference of the stored measurement values exceeds a predeterminable threshold. This threshold is selected in accordance with the above-mentioned measurements in such a manner that a marking signal is only present when several electrode spikes are present with a high probability.

To increase the measuring accuracy even further, the comparator, after forming the difference of the stored measurement value, can also form the mean value of the difference value over a predeterminable second time interval and deliver the marking signal if this mean value of the difference exceeds a predeterminable limit value. In known lamps, the growth of electrode spikes which can cause an arc perturbation takes longer than one second. For this reason, the second time interval can be selected within a range of seconds.

The lamp current is usually a square-wave current. The relevant square-wave signal is supplied by the control device to the commutating device. In the case of video projectors with a color wheel, a commutation must be synchronous with the revolution of the color wheel. For this purpose, the control device has a sync input at which a sync signal containing sync pulses is present in operation. The control device then produces a commutation which is synchronous with the sync pulses. As explained above, the color change of the projected light is usually generated by a rotating color wheel. If there is a commutation, it should take place at the same time as a color change. However, a color change is also conceivable which proceeds without commutation. In general, the sync signal is designed in such a manner that it has one sync pulse per revolution of the color wheel. In general, therefore, the sync signal does not contain a sync pulse for each color change. Instead, the sequence of color changes is preferably stored in the control device. This must be matched individually to the color wheel used. In particular, the distance of color changes on the color wheel does not need to be constant. Color wheels are also known which deliver several sync pulses per revolution. The decisive function of the sync pulses lies in that the control device receives information about the instantaneous position of the color wheel and thus has information about the times at which color changes occur.

Accordingly, the following is meant by the synchronism between the sync pulses and the commutation of the polarity of the direct-current source at the output of the commutating device: a sequence of times at which commutation is to take place is stored in the control device. With each sync pulse, the control device starts a sequence of commutations in accordance with the stored times. However, the times are not fixed but are normalized to the distance between two sync pulses in time. Thus, a commutation always falls on a color change for a given color wheel even if the speed of the color wheel changes. Suppressing commutations does not intervene in the synchronization between the commutation and the sync pulses. All commutations which are not suppressed coincide with a color change.

The teaching of the present invention demands, on the one hand, an extension of the time in which a lamp current flows with the polarity at which a higher lamp voltage prevails. On the other hand, the control device effects a commutation of the polarity in a time interval predetermined, e.g. by sync pulses. To meet the requirements of synchronism and the extension of one polarity, the control device advantageously suppresses at least one commutation which follows a polarity at which a higher lamp voltage prevails.

If the synchronism is not subject to any special demands, the control device can control the commutating device in such a manner that for a predetermined first switching time, a first polarity is coupled to the output and for a predetermined second switching time, a second polarity is coupled to the output, the control device extending the first switching time if a higher lamp voltage prevails at the first polarity.

The lamp is possibly optimized for a particular operating frequency. It is then advantageous if the control device shortens the second switching time by the amount by which it extends the first switching time.

The lamps mentioned in the present disclosure are designed for alternating current. Since the melting-off process proposed produces a direct-current component in the lamp current, attention must be paid to the fact that the direct-current component does not lead to a destruction of the lamp. At the very least, therefore, the control device must reset the first and second switching time to predetermined values if the lamp voltage is equal at both polarities. These predetermined values are intended to ensure that the lamp current does not contain a direct-current component in the mean.

The commutation can be advantageously suppressed also over a predetermined DC time. The DC time is advantageously selected to be so short that damage to the lamp due to a resulting direct-current component is impossible.

Instead of the DC time, an number N can also be predetermined which predetermines the number of commutations.

In the case of electrodes which exhibit little thermal inertia, even the suppression of two successive commutations can lead to an overheating of the electrode. It is then advantageous to suppress only every m-th commutation. By this means, the melting-off process can be controlled very precisely. For this purpose, "m" must be an odd natural number since otherwise no direct-current component is produced which causes a desired unilateral melting-off.

In practice, the control device is normally implemented with the aid of a microcontroller. The measurement input and possibly the sync input lead to an analog and digital input, respectively, of the microcontroller. The microcontroller controls the electronic switches, which are generally MOSFETs, via known driver circuits. The major part of the invention is then implemented in the software of the microcontroller.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
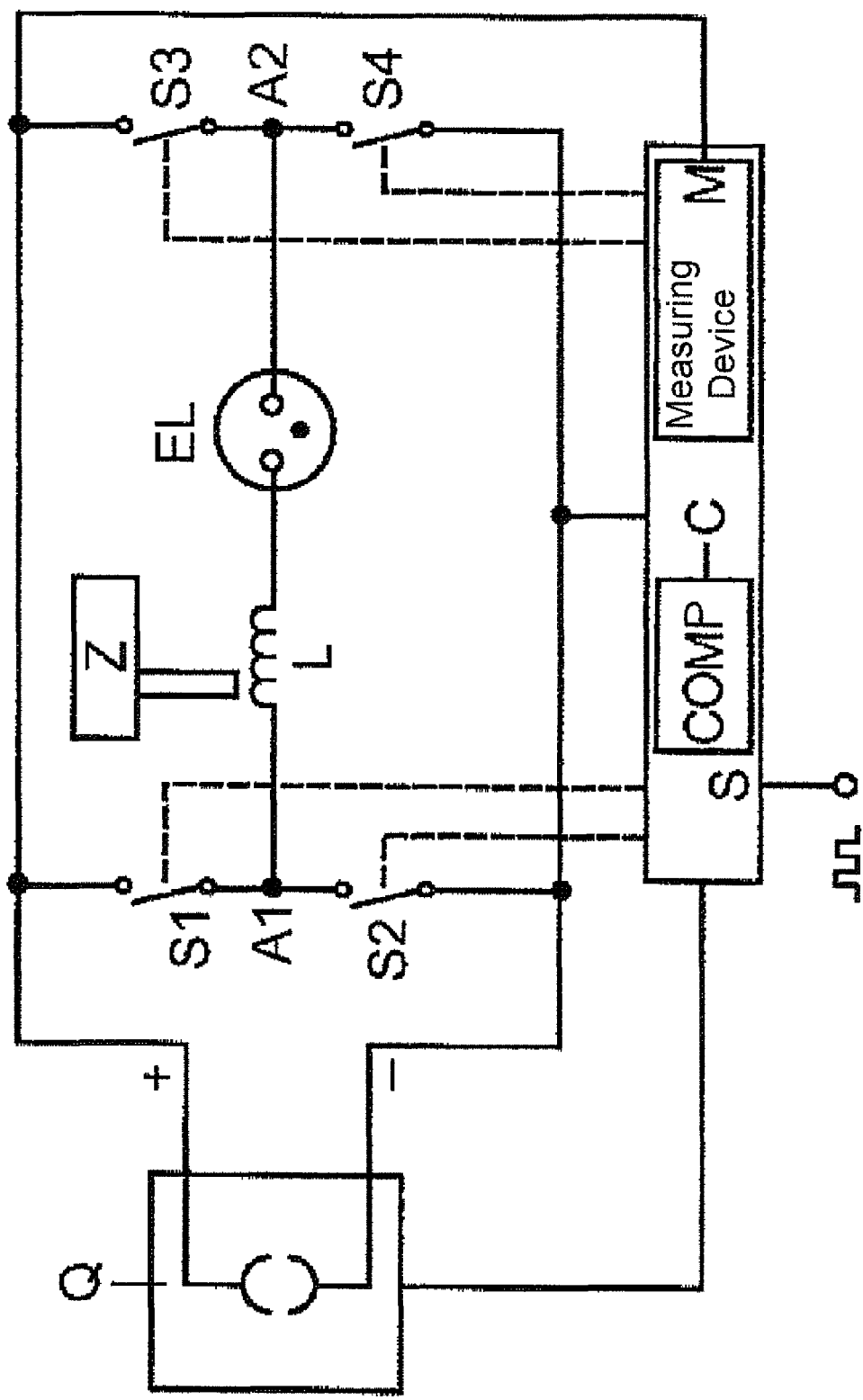
FIG. 1 shows a circuit arrangement for operating a high-pressure discharge lamp.

FIG. 1 shows a circuit arrangement for operating a high-pressure discharge lamp as it is known topologically from the prior art. The electronic switches S1, S2, S3 and S4 are connected in a full-bridge circuit between the positive and the negative pole of a direct-current source Q. The direct-current source Q generally consists of a buck-converter which obtains its power, for example, from a line voltage. The lamp EL is connected in the bridge branch which is between the nodes A1 and A2. In series with the lamp EL, a winding L of an ignition transformer is connected into which an ignition device Z couples a voltage which is used for igniting the lamp. This ignition device is of no importance to the present invention.

The full-bridge circuit forms the commutating device. The input of the commutating device is formed by an upper and a lower potential of the full-bridge circuit which are connected to the positive and the negative pole of the direct-current source Q. The output of the commutating device is formed by the bridge branch between nodes A1 and A2.

If the switches S1 and S4 are closed, the lamp current has a first polarity and a lamp current flows from node A1 to node A2. After a commutation, the switches S3 and S2 are closed and a lamp current having a second polarity flows from node A2 to node A1. Thus, a square-wave current is generated in the lamp EL. The designations of first and second polarity are arbitrary and do not restrict the generality.

The switches are controlled by the control device C. The activating lines from the control device C to the switches are drawn dashed. To be activated, the upper switches S1 and S3 need a charge pump which can also be contained in the control device C and is not shown.

The control device is supplied by a measurement input M with the input voltage of the full bridge which corresponds to the lamp voltage. If in one polarity of the lamp current, a lamp voltage prevails which is higher by a predetermined threshold value than in the other polarity, the control device C suppresses at least one commutation which would follow the polarity having the higher lamp voltage.

At a sync input S, a sync signal is present which is provided by the drive of a rotating color wheel, not shown. A connection between the control device C and the direct-current source Q indicates that the control device C can also be used for controlling the lamp current.

Figure 2:
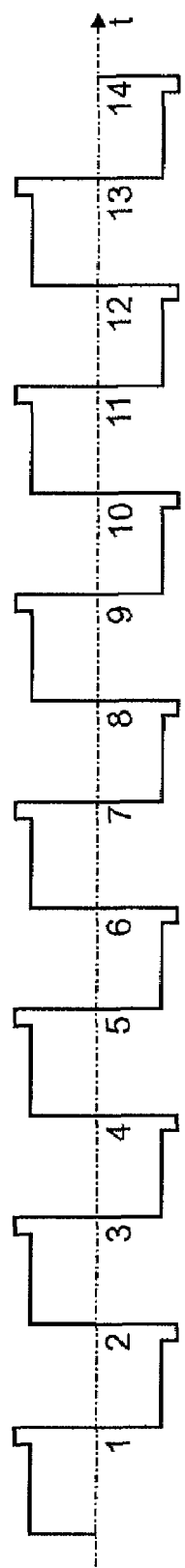
FIG. 2 shows the variation with time of the lamp current without suppression of commutations.

FIG. 2 shows the variation of the lamp current with time, without a commutation being suppressed. The commutations are numbered with numbers 1 to 14. Immediately before the commutation, the lamp current is increased in a pulsed manner. This is a measure for reducing flickering phenomena as is described, for example, in document WO 95/35645. This measure is independent of the extension of a lamp current polarity according to the present invention. The frequency of the square-wave variation of the current is usually between 50 Hz and 5 kHz.

Figure 3:
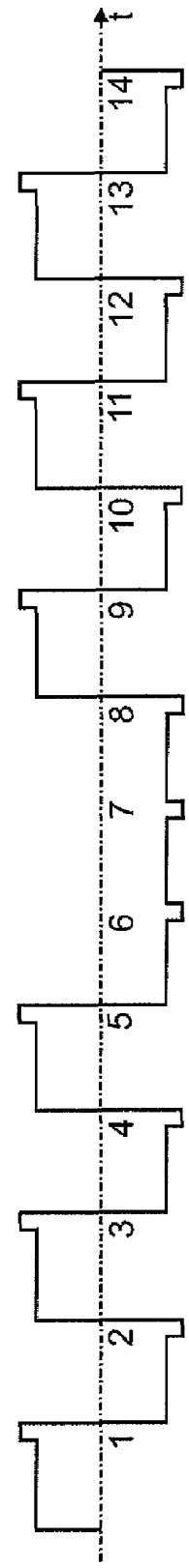
FIG. 3 shows the variation with time of the lamp current with suppression of two commutations.

FIG. 3 shows that the successive commutations 6 and 7 have been suppressed by the control device C. After this measure, the control device C firstly stops the suppression of further commutations in order to reliably prevent the lamp from overheating. The control device C also checks whether the condition for multiple electrode spikes exists, that is to say whether different lamp current polarities exhibit different lamp voltages. If this is so, the control device C again suppresses two successive commutations which are allocated to the lamp current polarity having the higher lamp voltage.

Figure 4:
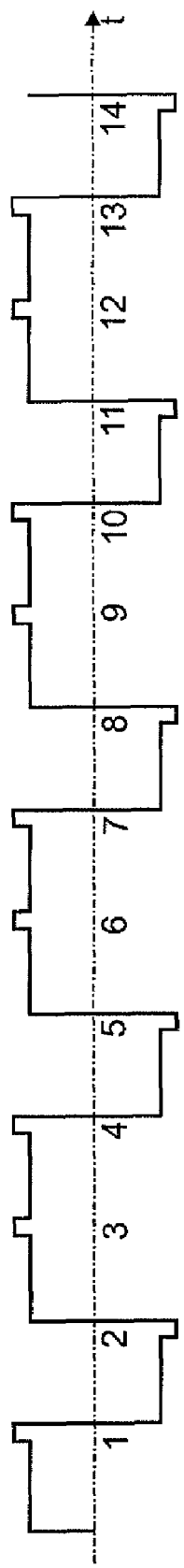
FIG. 4 shows the variation with time of the lamp current with suppression of every third commutation.

In FIG. 4, in comparison with FIG. 3, it is never two successive commutations which are suppressed. This may be necessary in the case of electrodes having a low thermal inertia or at a low operating frequency so that the relevant electrode is not overheated. In FIG. 4, every third commutation is suppressed. It is also possible to suppress every fifth, seventh or m-th commutation, m being an odd natural number. "m" must be odd so that the melting-off always acts on the same electrode. The control device C can carry out the suppression for a predetermined time, for a predetermined number of suppressions or until there is no longer any imbalance of the lamp voltages at different lamp current polarity.

Figure 5:
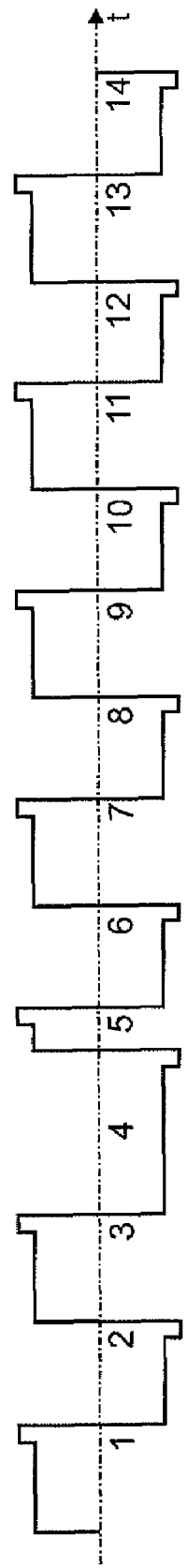
FIG. 5 shows the variation with time of the lamp current with extended switching time for one polarity.

FIG. 5 shows the variation of a lamp current with time in which a commutation has not been suppressed but displaced in time. By this means, the control device C extends the current flow having the polarity at which the higher lamp voltage prevails. In FIG. 5, the current flow is shortened for the other polarity to the same extent in which the current flow is extended for one polarity. In the literature, the change carried out by the control device C in the variation of the lamp current with time is also called change in the duty cycle.

Changing the duty cycle does not change the fundamental frequency of the lamp current.

If a change in the fundamental frequency of the lamp current does not produce any disadvantages, it is also possible to unilaterally extend only the current flow having one polarity without shortening the current flow having the other polarity.

The statements regarding the suppression of commutations correspondingly apply with respect to the duration or repetition of a change in the lamp current according to FIG. 5.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement for operating a discharge lamp, wherein the circuit arrangement comprises a commutating device, which is configured to exhibit an input which is coupled to a direct-current source and has an output for coupling to the discharge lamp; the commutating device being configured in such a manner that it couples the direct-current source to the output and a polarity with which the direct-current source is coupled to the output being commutated by a control device; the control device comprising a measurement input which is coupled to a measuring device which is configured to deliver a measurement value which is a measure of the magnitude of a lamp voltage; wherein the control device is configured to control the commutating device in such a manner that the polarity at which a higher lamp voltage prevails is coupled longer to the output, wherein the control device comprises a comparator which stores the measurement value in a first and in a second polarity, compares stored measurement values and delivers a marking signal which is used by the control device as information about the polarity at which the higher lamp voltage prevails.

2. The circuit arrangement as claimed in claim 1, wherein stored measurement values are mean values over a predeterminable first time interval.

3. The circuit arrangement as claimed in claim 1, wherein the comparator is configured to deliver the marking signal only if the difference of the stored measurement values exceeds a predeterminable threshold.

4. The circuit arrangement as claimed in claim 1, wherein the comparator is configured to form a mean value from the difference of the stored measurement values, form the mean value of this difference over a predeterminable second time interval and deliver the marking signal if this mean value exceeds a predeterminable limit value.

5. The circuit arrangement as claimed in claim 1, wherein the control device is configured to effect a commutation of the polarity within a predetermined time interval, and wherein the control device is configured to suppress at least one commutation which follows a polarity at which a higher lamp voltage prevails.

6. The circuit arrangement as claimed in claim 1, wherein the control device is configured to control the commutating device in such a manner that for a predetermined first switching time, a first polarity is coupled to the output and for a predetermined second switching time, a second polarity is coupled to the output, the control device being configured to extend the first switching time if a higher lamp voltage prevails at the first polarity.

7. The circuit arrangement as claimed in claim 6, wherein the control device is configured to shorten the second switching time by the amount by which it extends the first switching time.

8. The circuit arrangement as claimed in claim 6, wherein the control device is configured to reset the first switching time and the second switching time to predetermined values if the lamp voltage is equal at both polarities.

9. The circuit arrangement as claimed in claim 1, wherein the control device comprises a microcontroller, the control device comprises functions being specified by a software program in the microcontroller.

10. A computer program product, which stores the software program as claimed in claim 9.

11. The circuit arrangement as claimed in claim 1, wherein the discharge lamp is an extra-high-pressure discharge lamp.

12. A method for operating a discharge lamp, comprising: providing a measuring device which is configured to deliver a measurement value which is a measure of the magnitude of a lamp voltage; coupling the discharge lamp to a direct-current source via a commutating device; commutating the polarity of the direct-current source with an aid of the commutating device in each case after a predetermined switching time; storing the measurement value for each polarity; comparing stored measurement values; extending a switching time at the polarity at which a higher lamp voltage prevails; and resetting the switching time to a predetermined value if the same lamp voltage prevails at both polarities.

13. A microcontroller comprising instructions for operating a discharge lamp, the discharge lamp comprising a measuring device configured to deliver a measurement value which is a measure of a magnitude of a lamp voltage, wherein the discharge lamp is coupled to a direct-current source via a commutating device, and wherein the instructions, when executed by the microcontroller, cause the discharge lamp to: commutate a polarity of the direct-current source with an aid of the commutating device in each case after a predetermined switching time; store the measurement value for each polarity; compare stored measurement values; extend a switching time at the polarity at which a higher lamp voltage prevails; and reset the switching time to a predetermined value if the same lamp voltage prevails at both polarities.

* * * * *